Sept. 23, 1930.  G. A. SENTKOWSKI ET AL  1,776,327
MACHINE FOR USE IN THE BUILDING OF STORAGE BATTERIES
Filed Oct. 17, 1928  5 Sheets-Sheet 2

INVENTORS
George A. Sentkowski
Alexander Sentkowski
BY
ATTORNEYS

Sept. 23, 1930.    G. A. SENTKOWSKI ET AL    1,776,327
MACHINE FOR USE IN THE BUILDING OF STORAGE BATTERIES
Filed Oct. 17, 1928    5 Sheets-Sheet 4

Fig. 4.

INVENTORS
George A. Sentkowski
Alexander Sentkowski
BY
ATTORNEYS

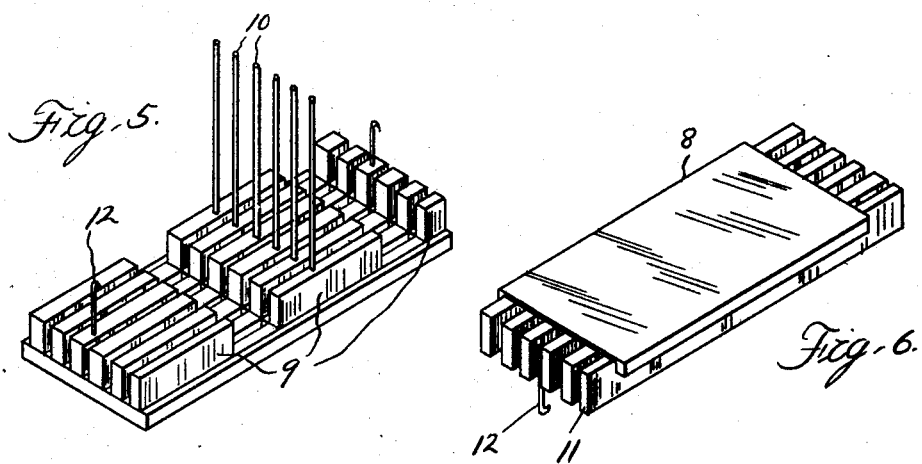
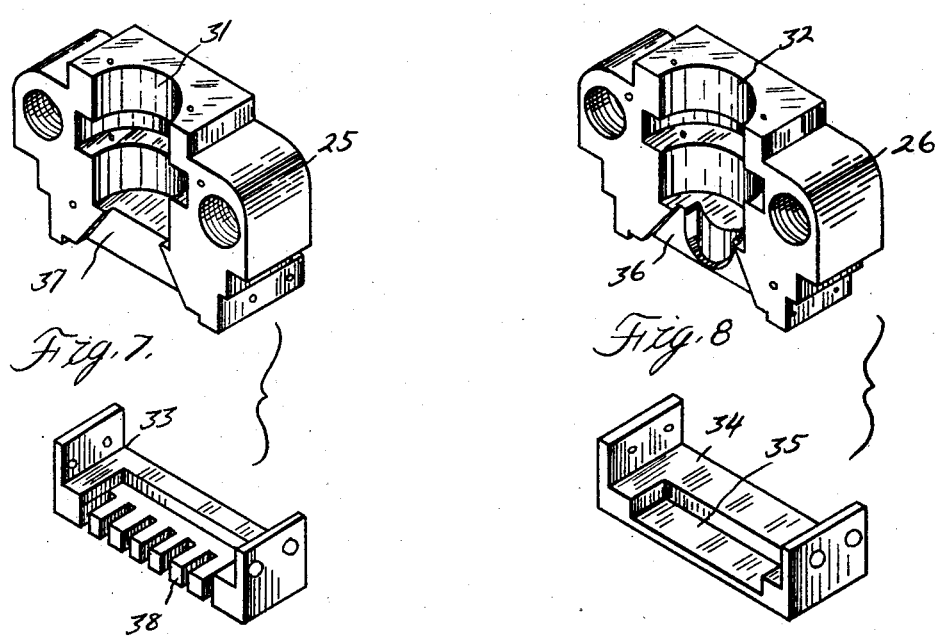
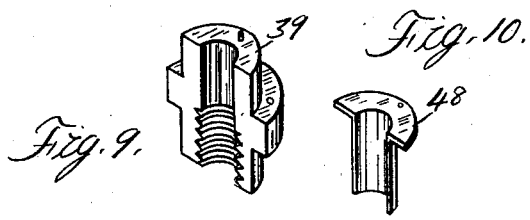

Patented Sept. 23, 1930

1,776,327

UNITED STATES PATENT OFFICE

GEORGE A. SENTKOWSKI AND ALEXANDER SENTKOWSKI, OF DETROIT, MICHIGAN

MACHINE FOR USE IN THE BUILDING OF STORAGE BATTERIES

Application filed October 17, 1928. Serial No. 313,082.

This invention relates generally to machines for use in the building of storage batteries and refers more particularly to a machine for assembling battery plates and for connecting a binding post to said plates.

In the building or rebuilding of storage batteries, it has been the practice to weld certain sets of plates together and then secure a binding post thereto by a separate operation. These operations are not only costly but require considerable time and labor. It is therefore the primary object of the present invention to reduce both the expense and labor of these operations by providing a machine which not only eliminates the welding operation, but permits the plates to be secured together and the binding post to be connected to the plates in a single operation.

A further object is to provide a machine for taking care of different types and sizes of plates and for forming binding posts of different diameters.

With the above and other objects in view, the invention consists in certain novel features of construction, combinations and arrangements of parts as will be more fully described and particularly pointed out in the appended claims.

In the accompanying drawings:

Figure 4 is a fragmentary perspective view showing the battery plates positioned within the receptacle with one of the mold sections positioned above the plates;

Figures 5 and 6 are views of the bottom and top positioning plates respectively;

Figure 7 is a disassembled view of one of the mold sections and the bottom block therefor;

Figure 8 is a disassembled view of the other mold section with its bottom block;

Figure 9 is a detail of a half bushing adapted to be applied to one of the mold sections;

Figure 10 is an adaptor for the bushing section shown in Figure 9;

Figure 11 is a fragmentary view of a set of battery plates with the top portions of the fingers bent over.

Figure 1:
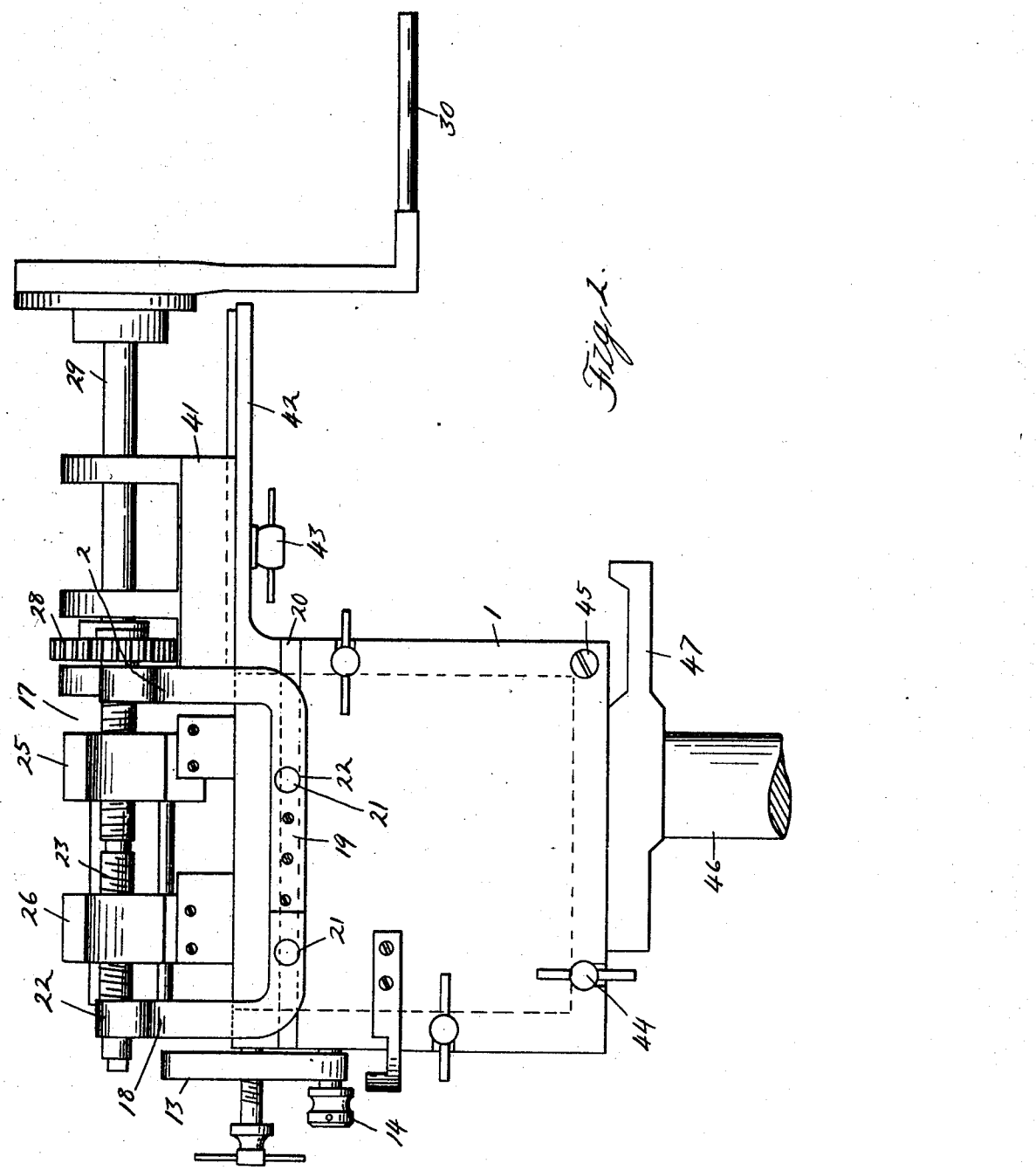
Figure 1 is a side elevation of a machine made in accordance with the present invention.
Figure 2:
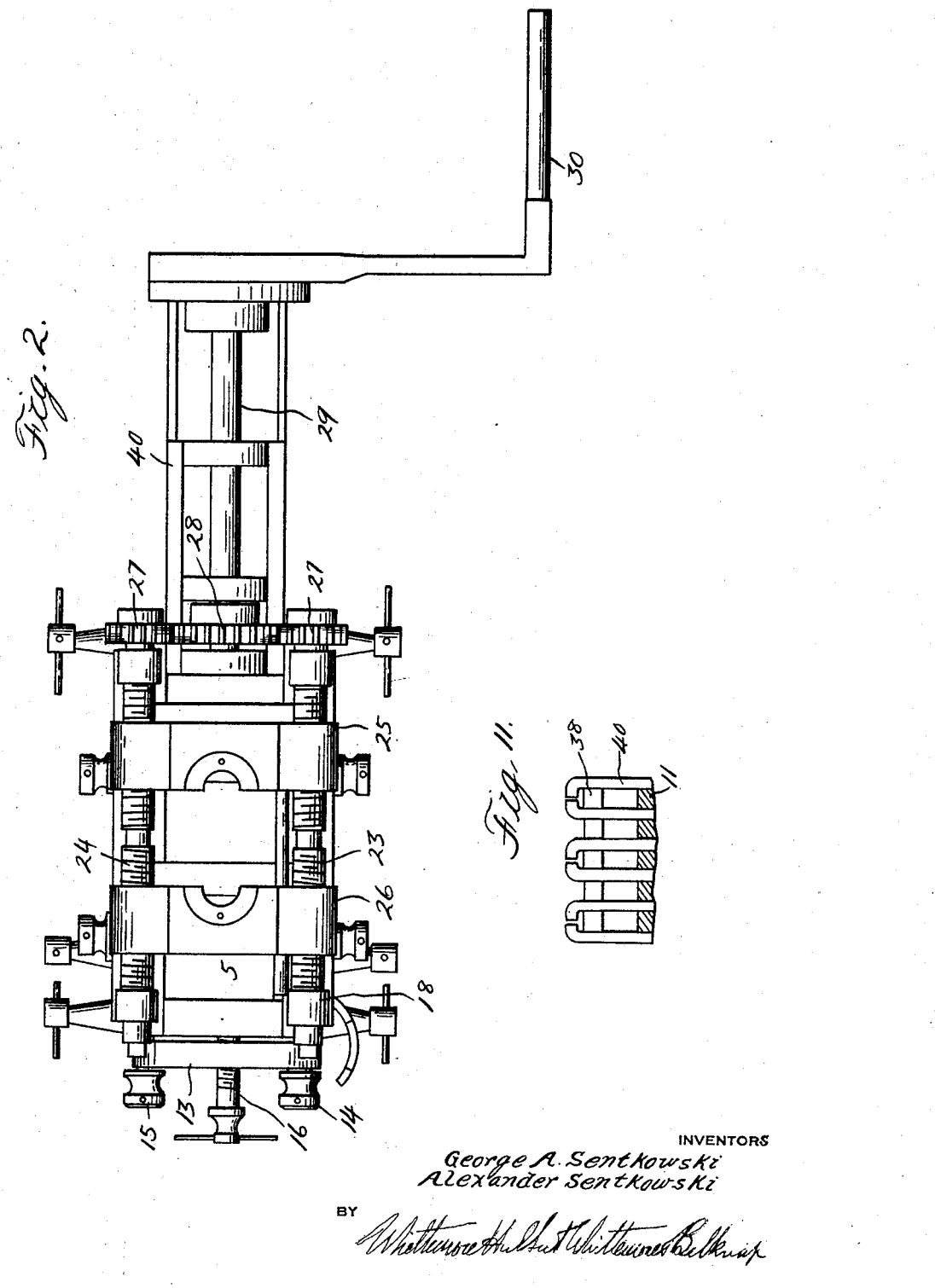
Figure 2 is a top plan view thereof.
Figure 3:
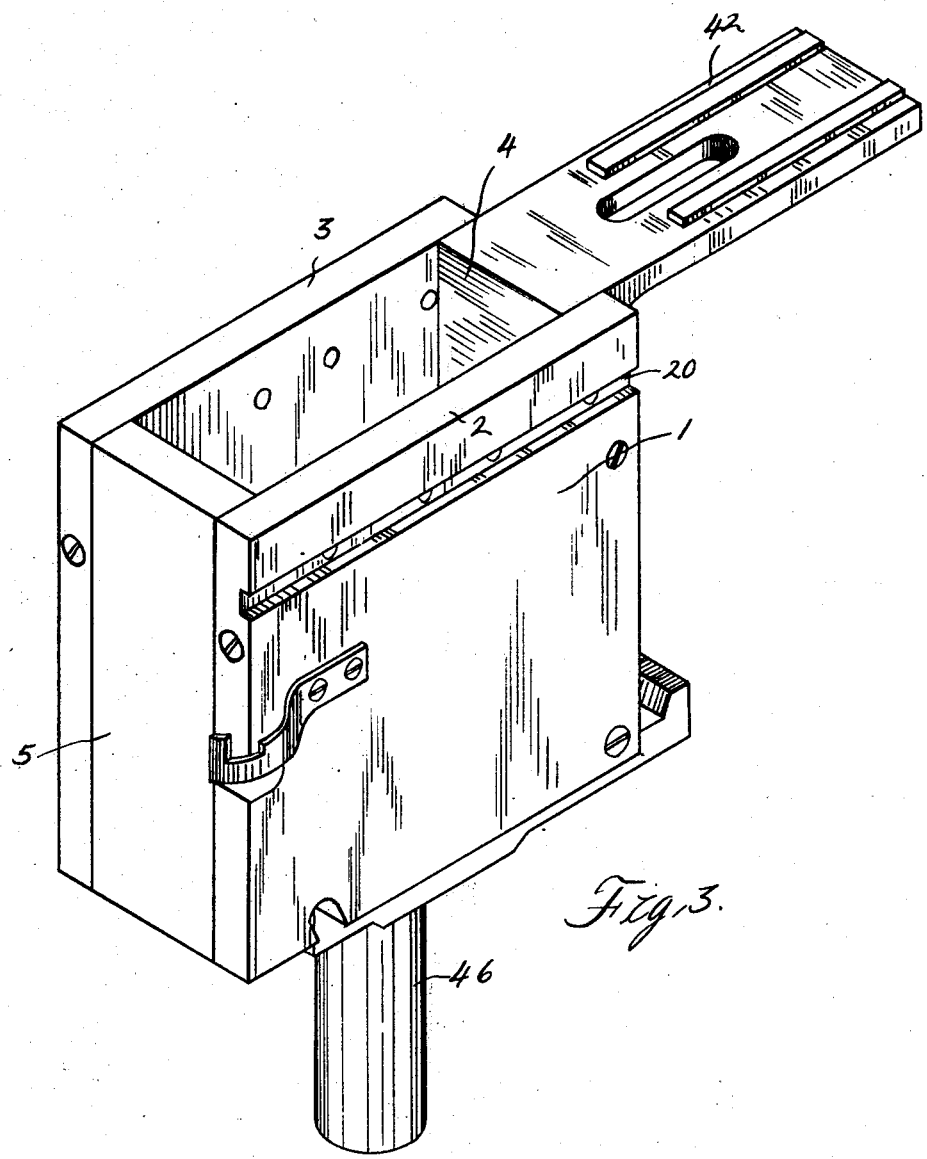
Figure 3 is a perspective view of the receptacle for receiving the battery plates with the mold and support therefor detached therefrom.

Generally our machine comprises a boxlike receptacle within which a plurality of separate battery plates are adapted to be securely clamped in spaced relation to each other and above which is movably supported, a pair of mold sections which are adapted to be moved together to form a complete mold directly above the usual upstanding ears or flanges of the plates. With the parts arranged in this position, molten metal such as lead, is poured into the mold, the arrangement being such that the metal will flow between the top portions of the plate flanges securely connecting the plates together and at the same time forming the binding post for said plates.

Specifically the device comprises a box-like receptacle 1 having side walls 2 and 3 respectively, an end wall 4 rigidly secured between the side walls and a hinged end wall 5 adapted to be opened to the position shown in Figure 4 for facilitating the placing of a number of battery plates 6 within the receptacle. These plates may be either positive or negative plates of a battery which is in the process of being built or rebuilt and are adapted to be correctly spaced within the receptacle by means of the bottom and top spacing plates 7 and 8 respectively.

As clearly shown in Figure 5, the bottom plate is provided with a plurality of spaced blocks 9 between which the lower edges of the battery plates are adapted to be positioned. Projecting upwardly from the center group of blocks 9, are rods 10 which further facilitate the positioning of the battery plates in the receptacle. The top plate 8 is likewise provided with a plurality of spaced bars or blocks 11 adapted to be slipped over the top portions of the plates as clearly shown in Figure 4 of the drawings. If desirable, one of each of the blocks 9 and 11 may be provided with cooperating hook members 12 between which suitable springs may be suspended for resiliently urging the top and bottom plates toward each other to insure the retention of the plates in spaced relation to each other.

After the plates 7 and 8 have been positioned with respect to the battery plates, the hinged end or door 5 is moved to its closed position and a latch member 13 pivotally mounted upon a bolt 14 is adapted to be moved to operative position with its free end engaging a second bolt 15, these two bolts being threaded into the side walls 2 and 3 respectively. A third bolt 16 positioned centrally of the latch 13 is adapted to be rotated so that its inner end will engage the door 5 and move the same into clamping position against the ends of the battery plates. With this arrangement, the battery plates are securely clamped within the receptacle 1.

Detachably secured to the receptacle 1 is a mold support 17 consisting of spaced yoke members 18 having longitudinal portions 19 engageable in grooves 20 formed in the upper portions of the walls 2 and 3 respectively and secured in position by means of suitable threaded bolts 21. The end portions of these yokes are enlarged and apertured to form suitable bearings 22 for receiving shafts 23 and 24. Each shaft is provided with reversely threaded portions upon which are mounted mold sections 25 and 26 respectively which upon rotation of the shafts, are adapted to be moved toward or away from one another. Any suitable means may be provided for accomplishing this movement and in the present instance we have provided pinions 27 meshing with an intermediate gear 28 mounted upon a shaft 29 and adapted to be rotated by the handle 30.

The mold sections are provided with substantially semi-circular recesses 31 and 32 respectively which cooperate to form an annular chamber adapted to receive molten metal for forming a binding post. The mold sections are provided with bottom blocks 33 and 34 respectively, block 34 having a rectangular recessed portion 35 communicating with the recess 32 by means of a cut away portion 36. Block 33 is also recessed and communicates with the recess 31 by means of a cut away portion 37. The base of the portion of the block 33 is provided with a plurality of spaced fingers 38, the purpose of which will be presently described. Half bushings 39 are adapted to be inserted in each of the recesses 31 and 32 and are of a size to form a binding post of standard diameter.

With the battery plates clamped in the receptacle as above described and the mold support secured to the top of the receptacle, a rotation of the handle 30 will cause the mold sections to move together. As the section 31 travels toward the battery plates the fingers 38 will move between the upwardly projecting tongues 40 of the plates, the whole arrangement being such that as the opposed faces of the sections meet, the tongues of the battery plates will be entirely received within the spaces between the fingers 38 and will abut against the inner end portions thereof. The device is furthermore so constructed that the tongues are adapted to extend substantially a quarter of an inch above the top faces of the fingers and to also have a snug fit therewith sufficient to prevent molten metal from flowing therebetween. With the mold sections thus tightly secured together, molten metal such as lead is adapted to be poured into the annular opening formed by the half bushings. This metal will continue to flow down through the passage formed by the recessed portions 36 and 37 until it is prevented from flowing further downwardly by the tight joint between the fingers 38 and the tongues of the battery plates. In view of the fact that the tongues extend above the fingers, the metal will securely connect the plates together and will at the same time, form the binding post for this particular set of battery plates. After the metal has cooled and hardened sufficiently, the handle is actuated to separate the mold sections whereupon the plates may be removed from the receptacle, a new set of plates inserted and the above operation repeated.

In inserting a set of battery plates in the receptacle the mold support and mold sections may be removed from the receptacle by unscrewing the bolts 21 and lifting the yokes 18 out of the grooves 20 thereby disengaging the pinions 27 from the gear 28. It should be stated that the gear 28, shaft 29 and handle 30 are mounted as a unit in a support 41 which is in turn removably supported upon a horizontal stand 42 projecting outwardly from the end plate 4 of the receptacle. The support 41 is removably positioned upon the stand 42 by means of fastening means 43.

It should furthermore be stated that if the same type of battery plates are to be inserted as the ones previously operated upon, it will be unnecessary to remove the mold support from the top of the receptacle and that the plates may be placed within the box by opening the door 5, loosening bolts 44 and permitting the sides 2 and 3 to swing upwardly away from the base of the receptacle about the pivot 45. After the plates have been positioned upon the base of the receptacle, the parts can be assembled in the manner above described and the plates securely clamped in position. If it should happen that a set of battery plates are shorter than standard, this can be remedied by inserting a plate (not shown) beneath the bottom plate 7 so that the fingers 40 will extend the required distance above the tongues 38. It should furthermore be stated that our machine is adapted to receive battery plates regardless of the position of the upstanding tongues 40. If it should happen that the tongues of a set of plates are located intermediate the ends, it will only be necessary to remove the bolts 21 and slide the yokes 18 in the grooves 20 to the new position. The bolt holes are so positioned with respect to the mold sections that when the mold sections are moved to operative position, the fingers 38 of the block 33 will correctly engage the tongues of the plates so that it will only be necessary for the person operating the machine to effect an adjustment of the mold support to one or the other of the aforesaid positions.

It will of course, be apparent that our machine may be supported upon any suitable stand and in the present instance we have shown a pedestal 46 having a flat supporting surface 47 upon which the receptacle is adapted to be positioned during the molding operation. It will furthermore be noted that we have provided adapters 48 which may be fitted within the half bushings 39 in the event the binding post is to be of a smaller diameter than usual.

In Figure 11, we have shown a fragmentary view of a set of battery plates in which the top portions of the fingers have been bent over before insertion of the plates in the receptacle. This will of course effect a better bond between the plates and molten metal and the operator may treat each set of plates in this manner if he so desires, as it will not in the least, interfere with the operation of the mold sections. It should be stated however, that a very good bond may be obtained without bending the plates and that this additional step is not essential in assembling the plates.

From the foregoing it will be readily apparent that we have provided a novel form of machine for assembling battery plates in which molten metal is utilized for forming a binding post for the plates and for securing the plates together. It will also be apparent that these operations are formed simultaneously, thus effecting a great saving in time and labor and materially reducing the cost of production.

What we claim as our invention is:

1. In a device of the character described, a receptacle for receiving a plurality of battery plates, and a binding post mold supported upon said receptacle and having its lower end open onto said plates.

2. In a device of the character described, a receptacle, a plurality of battery plates positioned therein, means removably mounted in said receptacle for spacing said battery plates, means for clamping said plates in said receptacle, and a binding post mold supported upon said receptacle and communicating with said plates.

3. In a device of the character described, a receptacle for receiving a plurality of battery plates, a sectional binding post mold supported upon said receptacle, and means for moving said mold sections into and out of operative position over said plates.

4. In a device of the character described, a receptacle for receiving a plurality of battery plates, a binding post mold support mounted on said receptacle, a pair of threaded shafts journalled in said support, and complementary mold sections carried by said shafts and movable into and out of operative position above said plates.

5. In a device of the character described, a receptacle for receiving a plurality of battery plates, a binding post mold support mounted on said receptacle, complementary mold sections mounted on said support and movable thereon to operative position over said battery plates, a platform carried by said receptacle at one side thereof, and means including an actuating member slidably mounted on said platform for moving said mold sections.

6. In a device of the character described, a receptacle for receiving a plurality of battery plates with the projecting tongues thereof aligned, a binding post mold support mounted on said receptacle, and complementary mold sections mounted on said support and movable thereon to operative position over said tongues, one of said mold sections being provided with portions adapted to extend between adjacent tongues below the top edges thereof for permitting molten metal poured into said mold to flow upon said tongues while preventing flowing of said molten metal over said plates.

7. In a device of the character described, a receptacle for receiving a plurality of battery plates with the projecting tongues thereof aligned, a binding post mold support mounted on said receptacle, and complementary mold sections movably mounted on said support, each section being provided with a recess adapted to cooperate with the recess of the other section to form a chamber for receiving molten metal, and a member detachably secured to one of said mold sections said member being provided with fingers adapted to extend between adjacent tongues below the top edges thereof for permitting the molten metal to flow upon said tongues while preventing flowing of said molten metal over said plates.

8. In a device of the character described, a receptacle for receiving a plurality of battery plates, a binding post mold support mounted on said receptacle, complementary mold sections mounted on said support and movable thereon to operative position over said battery plates, and a member associated with one of said mold sections having its bottom portion formed with spaced fingers adapted to extend between projecting portions of adjacent battery plates below the top edges thereof for permitting molten metal poured into said mold to flow upon said projecting portions while preventing flowing of said molten metal over said plates.

9. In a device of the character described, a receptacle, a plurality of battery plates positioned therein, top and bottom separator plates removably mounted in said receptacle for retaining said battery plates in spaced relation, and means for clamping said plates in said receptacle.

10. In a device of the character described, a receptacle having one of its walls hingedly secured thereto, a plurality of battery plates positioned in said receptacle, top and bottom separator plates for retaining said battery plates in spaced relation, and means for clamping said hinged wall against said plates, said means comprising a latch member carried by said receptacle, and a bolt threadedly engaging said latch member and movable into and out of engagement with said hinged wall.

11. In a device of the character described, a receptacle for receiving a plurality of battery plates, a binding post mold support mounted on said receptacle, said support including spaced yoke members detachably secured to said receptacle and having their end portions formed with openings constituting bearings, shafts journalled in said bearings, and mold sections mounted on said shafts.

12. In a device of the character described, a receptacle for receiving a plurality of battery plates, a binding post mold support mounted on said receptacle, said support including spaced yoke members having their base portions detachably secured in grooves, formed in said receptacle, said yokes having their end portions formed with openings constituting bearings, shafts journalled in said bearings, and mold sections mounted on said shafts.

13. In a device of the character described, a receptacle for supporting a plurality of battery plates with the projecting tongues thereof aligned, a binding post mold, and means for mounting said mold in a selected one of a plurality of spaced positions relative to said receptacle to align said mold with said tongues.

14. In a device of the character described, a receptacle for supporting a plurality of battery plates with the projecting tongues thereof in alignment, a binding post mold, a support for said mold, and connections between said support and said receptacle for supporting the former from the latter, said connections permitting positioning of said support in a selected one of a plurality of spaced positions whereby said mold may be aligned with said tongues.

15. In a device of the character described, a receptacle for receiving a plurality of battery plates, a mold support, a binding post mold carried by said support, and means for mounting said support on said receptacle in a selected one of two spaced positions, whereby said mold may be positioned adjacent the center or adjacent one side of said receptacle.

16. In a device of the character described, a receptacle for receiving a plurality of battery plates, top and bottom separator plates removably mounted in said receptacle for retaining said battery plates in spaced relation, a binding post mold support mounted on said receptacle, a binding post mold carried by said support, and a member detachably mounted on said mold having spaced fingers adapted to extend between raised portions of adjacent battery plates, said last mentioned member and said separator plates being adapted for removal and replacement whereby said device may be adapted to operate on different series of plates.

17. In a device of the character described, a receptacle for receiving a plurality of battery plates, and a binding post mold associated with said receptacle, said mold including a pair of mold sections each of which is provided with a semi-circular recess, and means for moving said mold sections into juxtaposition to each other whereby said semi-circular recesses cooperate to form a cylindrical chamber for forming a binding post.

18. In a device of the character described, a receptacle, a sectional mold associated with said receptacle, the sections of said mold having recesses which cooperate to form a cylindrical chamber, and a bushing detachably mounted in said chamber for regulating the size thereof, said bushing being provided with a threaded portion adapted during the molding operation to form threads on a binding post molded in said chamber.

19. In a device of the character described, a receptacle for receiving a plurality of battery plates, a sectional mold associated with said receptacle and having a portion forming a chamber for molding a binding post, a bushing detachably mounted in said chamber, and an adaptor fitted within said bushing.

In testimony whereof we affix our signatures.

GEORGE A. SENTKOWSKI.
ALEXANDER SENTKOWSKI.